US011142031B1

(12) United States Patent
Covington et al.

(10) Patent No.: US 11,142,031 B1
(45) Date of Patent: *Oct. 12, 2021

(54) ARTICULATING FRONT AXLE MOWER

(71) Applicant: Bad Boy, Inc., Batesville, AR (US)

(72) Inventors: Charles Bradley Covington, Batesville, AR (US); Warren Russell Long, Batesville, AR (US)

(73) Assignee: Bad Boy, Inc., Batesville, AR (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/797,328

(22) Filed: Feb. 21, 2020

Related U.S. Application Data

(63) Continuation of application No. 15/708,307, filed on Sep. 19, 2017, now Pat. No. 10,569,609.

(60) Provisional application No. 62/400,321, filed on Sep. 27, 2016, provisional application No. 62/396,661, filed on Sep. 19, 2016.

(51) Int. Cl.
| B60G 3/06 | (2006.01) |
| A01D 34/82 | (2006.01) |
| A01D 67/00 | (2006.01) |
| B60G 7/00 | (2006.01) |
| B60G 15/06 | (2006.01) |
| A01D 101/00 | (2006.01) |
| A01D 34/66 | (2006.01) |

(52) U.S. Cl.
CPC ............... *B60G 3/06* (2013.01); *A01D 34/82* (2013.01); *A01D 67/00* (2013.01); *B60G 7/001* (2013.01); *B60G 7/008* (2013.01); *B60G 15/06* (2013.01); *A01D 34/66* (2013.01); *A01D 2101/00* (2013.01); *B60G 2300/084* (2013.01)

(58) Field of Classification Search
CPC .......... B60G 3/06; B60G 7/008; B60G 15/06; B60G 7/001; B60G 2300/084; A01D 67/00; A01D 34/82; A01D 2101/00; A01D 34/66
See application file for complete search history.

(56) References Cited

U.S. PATENT DOCUMENTS

| 2,442,831 A | 6/1948 | Suttles |
| 2,689,136 A | 9/1954 | Hendrickson |
| 2,915,776 A | 12/1959 | Hanson et al. |
| 3,025,079 A | 3/1962 | Gouirand |
| 3,669,467 A | 3/1972 | Dunlap et al. |
| 3,737,174 A | 6/1973 | Hickman |
| 4,310,171 A | 1/1982 | Merkle |
| 4,310,717 A | 1/1982 | Eastman et al. |
| 4,485,521 A | 12/1984 | Welsch et al. |
| 4,559,669 A | 12/1985 | Bonzer et al. |

(Continued)

OTHER PUBLICATIONS

Bad Boy Mowers "AOS Diesel Model Mower Owner's & Parts Manual" 2010 Edition; pp. 1-40.

(Continued)

*Primary Examiner* — Drew J Brown
(74) *Attorney, Agent, or Firm* — Bracewell LLP; Christopher L. Drymalla

(57) ABSTRACT

In a riding mower having a frame supported on front and rear wheels, a mower deck supported beneath the frame, a chair on said frame and a source of motive power also supported on said frame and including an improved suspension system with an articulating front axle that substantially isolates the front wheels from the frame of the lawnmower to thereby dampen vibrations transmitted to the operator as the vehicle traverses the ground.

38 Claims, 7 Drawing Sheets

(56) References Cited

U.S. PATENT DOCUMENTS

| | | | |
|---|---|---|---|
| 4,813,215 | A | 3/1989 | Chase et al. |
| 5,400,469 | A | 3/1995 | Simonsen |
| 5,899,470 | A | 5/1999 | Heitzmann |
| 5,979,920 | A | 11/1999 | Krakowiak et al. |
| 6,026,920 | A | 2/2000 | Obeda et al. |
| 6,170,242 | B1 | 1/2001 | Gordon |
| 6,460,318 | B1 | 10/2002 | Ferris et al. |
| 6,857,254 | B2 | 2/2005 | Melone et al. |
| 6,889,793 | B2 | 5/2005 | Okada et al. |
| 7,364,024 | B2 | 4/2008 | Bartell et al. |
| 7,708,292 | B2 | 5/2010 | Foster |
| 8,997,914 | B2 | 4/2015 | Umemoto et al. |
| 9,161,490 | B2 | 10/2015 | Melone et al. |
| 9,730,386 | B1 | 8/2017 | Covington et al. |
| D830,419 | S | 10/2018 | Covington et al. |
| D830,420 | S | 10/2018 | Covington et al. |
| 10,349,577 | B1 | 7/2019 | Covington et al. |
| 10,356,978 | B1 | 7/2019 | Covington et al. |
| 2005/0144923 | A1 | 7/2005 | Melone et al. |
| 2007/0284839 | A1 | 12/2007 | Sasaoka |
| 2008/0302075 | A1 | 12/2008 | Eavenson, Sr. |
| 2009/0033054 | A1 | 2/2009 | Foster |
| 2011/0193309 | A1 | 8/2011 | Nance |
| 2011/0197419 | A1 | 8/2011 | Melone et al. |
| 2013/0074466 | A1 | 3/2013 | Zwieg et al. |
| 2013/0264788 | A1 | 10/2013 | Smyth et al. |
| 2013/0291508 | A1 | 11/2013 | Melone et al. |
| 2014/0109538 | A1 | 4/2014 | Sugio |
| 2016/0347137 | A1 | 12/2016 | Despres-Nadeau et al. |
| 2017/0028844 | A1 | 2/2017 | Melone et al. |
| 2017/0181376 | A1 | 6/2017 | Reichard |
| 2018/0084715 | A1 | 3/2018 | Fergus et al. |
| 2018/0125006 | A1 | 5/2018 | Smith et al. |
| 2018/0229570 | A1 | 8/2018 | Fay, II et al. |
| 2018/0249630 | A1 | 9/2018 | Mullet et al. |
| 2019/0193501 | A1 | 6/2019 | Brady et al. |
| 2020/0352098 | A1 | 11/2020 | Fujii et al. |

OTHER PUBLICATIONS

Bad Boy Mowers "AOS Model Mower Owner's & Parts Manual" 2010 Edition; pp. 1-40.
Bad Boy Mowers "Bad Boy AOS Part Manual: 35hp Vanguard; 27hp Kawasaki" 2007; pp. 1-31.
Bad Boy Mowers "Bad Boy Diesel Part Manual: 35hp Caterpillar Diesel; 28hp Caterpillar Diesel" 2007; pp. 1-30.
Bad Boy Mowers "Bad Boy Parts Manual for Pup and Lightning Models: 23hp Vanguard; 26hp Kawasaki; 30hp Kohler; 32hp Vanguard" 2007; pp. 1-30.
Bad Boy Mowers "Compact Diesel Model Mower Owner's & Parts Manual" 2010 Edition; pp. 1-36.
Bad Boy Mowers "Diesel AOS & Compact Zero-Turn Mower Owner's, Service & Parts Manual" 2011; pp. 1-56.
Bad Boy Mowers "Diesel Compact Diesel Models Zero-Turn Mower Owner's, Service & Parts Manual" 2012; pp. 1-52; see pp. 33 and 35.
Bad Boy Mowers "Lightning & Pup Zero-Turn Mower Owner's, Service & Parts Manual" 2011; pp. 1-56.
Bad Boy Mowers "Outlaw Stand-On Model Zero-Turn Mower Owner's, Service & Parts Manual"; 2017; pp. 1-58.
Bad Boy Mowers "Outlaw XP Models Zero-Turn Mower Owner's, Service & Parts Manual" 2012; pp. 1-44; see pp. 29-30.
Bad Boy Mowers "Parts Manual for Bad Boy AOS Models: 35hp Vanguard; 27hp Kawasaki" 2008; pp. 1-29.
Bad Boy Mowers "Parts Manual for Bad Boy AOS Models: 35hp Vanguard; 27hp Kawasaki" 2009; pp. 1-28.
Bad Boy Mowers "Parts Manual for Bad Boy Diesel Models: 35hp Caterpillar; 28hp Caterpillar" 2008; pp. 1-28.
Bad Boy Mowers "Parts Manual for Bad Boy Diesel Models: 35hp Caterpillar; 28hp Caterpillar" 2009; pp. 1-27.
Bad Boy Mowers "Parts Manual for Bad Boy Pup and Lightning Models: 23hp Vanguard; 30hp Kohler; 26hp Kawasaki; 32hp Vanguard; 31hp Kawasaki" 2008; pp. 1-36.
Bad Boy Mowers "Parts Manual for Bad Boy Pup and Lightning Models: 23hp Vanguard; 30hp Kohler; 26hp Kawasaki; 32hp Vanguard; 31hp Kawasaki" 2009; pp. 1-33.
Bad Boy Mowers "Pup or Lightning Model Mower Owner's & Parts Manual" 2010 Edition; pp. 1-48.

ARTICULATING FRONT AXLE MOWER

CROSS-REFERENCE TO RELATED APPLICATIONS

This application is continuation of U.S. patent application Ser. No. 15/708,307 titled "Articulating Front Axle Mower" which was filed on Sep. 19, 2017 and claims priority to U.S. Provisional Patent Application No. 62/396,661 filed on Sep. 19, 2016 and priority to U.S. Provisional Patent Application No. 62/400,321 filed on Sep. 27, 2016, each of which are incorporated by reference.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates generally to riding mowers and, more particularly, to an improved suspension system on such mowers or the like. Known art can be found in U.S. Class 280, subclass 124 and in other classes and subclasses.

2. Description of the Known Art

Those skilled in the art will appreciate that riding mowers have been a staple for maintaining residential yards, commercial lawns, golf courses and highway rights of way for many years. They are seen moving along grass in many settings including grassy center dividers and along the sides of roads in rough, sometimes rocky terrain, and in all sorts of attitudes from flat and level to severe side hills.

In many instances, an operator may be in the seat for hours, and even with a kidney belt, will suffer considerable discomfort and, in some cases, injury from traversing rough ground at speed. Indeed, it is not inconceivable that the constant bouncing and jarring could cause an operator to lose control, resulting in damage to the operator and others and also to the equipment as well.

The underlying purpose and function of the present invention is to provide an element of relief to an operator and increased vehicle control. The invention disclosed in U.S. Pat. No. 7,708,292 issued to Foster deals with these issues. While this invention works well for its intended purpose, an improved system that uses an articulating front axle that also improves vehicle stability while also promoting operator comfort would be desirable.

Most of the other known riding mowers in use today have their wheels affixed directly to the frame of the mower. In the late '90s, Ferris filed an application for a suspension system for riding mowers. The application claims priority based on provisionals, at least one of which dates back to 1996, and was divided and one of those continuations-in-part issued as Ferris et al. U.S. Pat. No. 6,460,318. The patent features a four bar mechanism relatively common in automotive suspensions.

Known art which may be relevant to the present invention includes the following patents with their abstracts, the teachings of which are incorporated by reference.

Gordon U.S. Pat. No. 6,170,242 is yet another patent assigned to Ferris Industries and claims priority under a 1997 provisional, which is also claimed under the earlier mentioned Ferris et al. patent. Gordon, like Ferris et al., features a four bar mechanism.

A very early patent featuring a rubber bumper between two elements in an automotive structure is found in Hickman U.S. Pat. No. 3,737,174.

Several other patents offer variations on the same theme. See, for example, Dunlap et al. U.S. Pat. No. 3,669,467, which has additional buffering devices, such as springs, leaf or coil, and shock absorbing devices. Dunlap has a pair of cushions, but also uses a pair of rods 32 and 34, which attach directly to the frame rail.

Krakowiak et al. U.S. Pat. No. 5,979,920, uses the simple bumper between the frame rail and a leaf spring. This is a device which is common on many of the earlier motor vehicles.

Merkle U.S. Pat. No. 4,310,717, uses what he refers to as an elastomeric spring, again, between the frame rail and what he refers to as a web section which holds the axle upon which the wheel is connected. It appears in the drawing that there may be a shock absorber in the middle of this assembly.

Bonzer et al. U.S. Pat. No. 4,559,669, employs a resilient buffer 19 for a caster assembly. Heitzman U.S. Pat. No. 5,899,470 uses a couple of resilient buffers as part of a system for adjusting camber and caster. It is evident from these patents that using an elastomeric as a spring or shock absorber is not new in the art. All of these references seek, to a greater or lesser extent, some modulation of the amplitude and frequency of shock transmitted through a wheel of a vehicle, but are unsuited for a riding mower.

Also, commercially available equipment and components may be relevant, including hollow metal frames, elastomeric bushings or cushions and the like. Such equipment may be used in implementing an exemplary embodiment in accordance with the present invention.

None of these references, either singly or in combination, disclose or suggest the present invention. It is desirable to have an improved lawnmower to address the perceived shortcomings of the known art.

While it is evident from past attempts that suspension systems for lawnmowers are desirable, the known art is limited in its teaching and utilization, and an improved system is needed to overcome these limitations. An improved suspension system should provide a simple and efficient system for meeting the various needs of the users and the like.

SUMMARY OF THE INVENTION

The present invention addresses the perceived needs in the known art discussed above. In this regard, the present invention substantially fulfills this need. The suspension system for lawnmower may be advantageously used with zero-turn lawnmowers or others using transaxles combined with hydraulic pumps for motive power and the like. The conventional rigid front axle is replaced by an articulating front axle with arms that are dampened by at least one pillow interposed between the frame and each front caster wheel with each pillow being of a resilient material for absorbing shock and vibration resulting from a wheel contacting irregularities in the terrain traversed thereby.

In one exemplary embodiment in accordance with the present invention an improved suspension system with an articulating front axle is provided that substantially isolates the front wheels from the frame of the lawnmower to thereby dampen vibrations transmitted to the operator as the vehicle traverses the ground.

The apparatus of the invention is capable of receiving additional, optional features which are not a part of the present invention. For example, a purchaser or user may specify an optional mulcher or bagger or the like for a lawnmower. Other optional features, some of which may be illustrated herein, may or may not be included with apparatus incorporating the basic aspects of present invention.

In addition to providing the features and advantages referred to above, it is an object of the present invention to provide an improved suspension system for lawnmower.

A basic object of the present invention is to provide a more stable lawnmower.

Yet another object of the present invention is to enhance user comfort.

A related object of the present invention is to provide a safer lawnmower.

These and other objects and advantages of the present invention, along with features of novelty appurtenant thereto, will appear or become apparent by reviewing the following detailed description of the invention in conjunction with the appended drawings.

BRIEF DESCRIPTION OF THE SEVERAL VIEWS OF THE DRAWINGS

In the following drawings, which form apart of the specification and which are to be construed in conjunction therewith, and in which like reference numerals have been employed throughout wherever possible to indicate like parts in the various views.

DETAILED DESCRIPTION OF THE INVENTION

Figure 1:
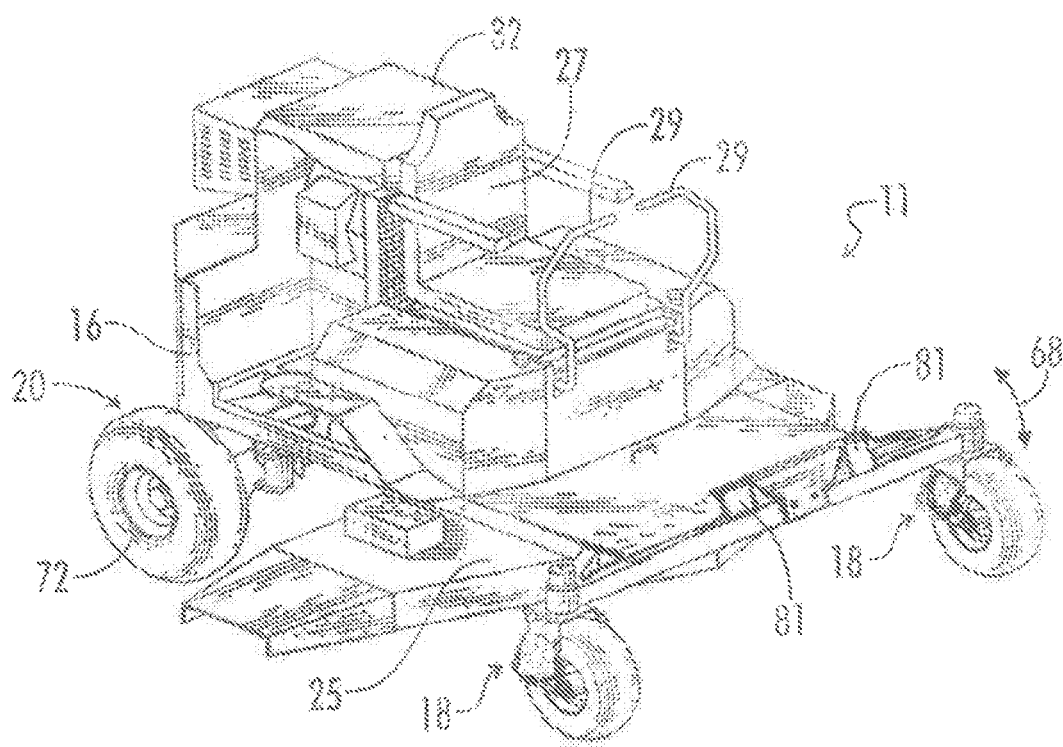
FIG. 1 is a perspective view of a riding mower in accordance with an embodiment of the present invention.
Figure 2:
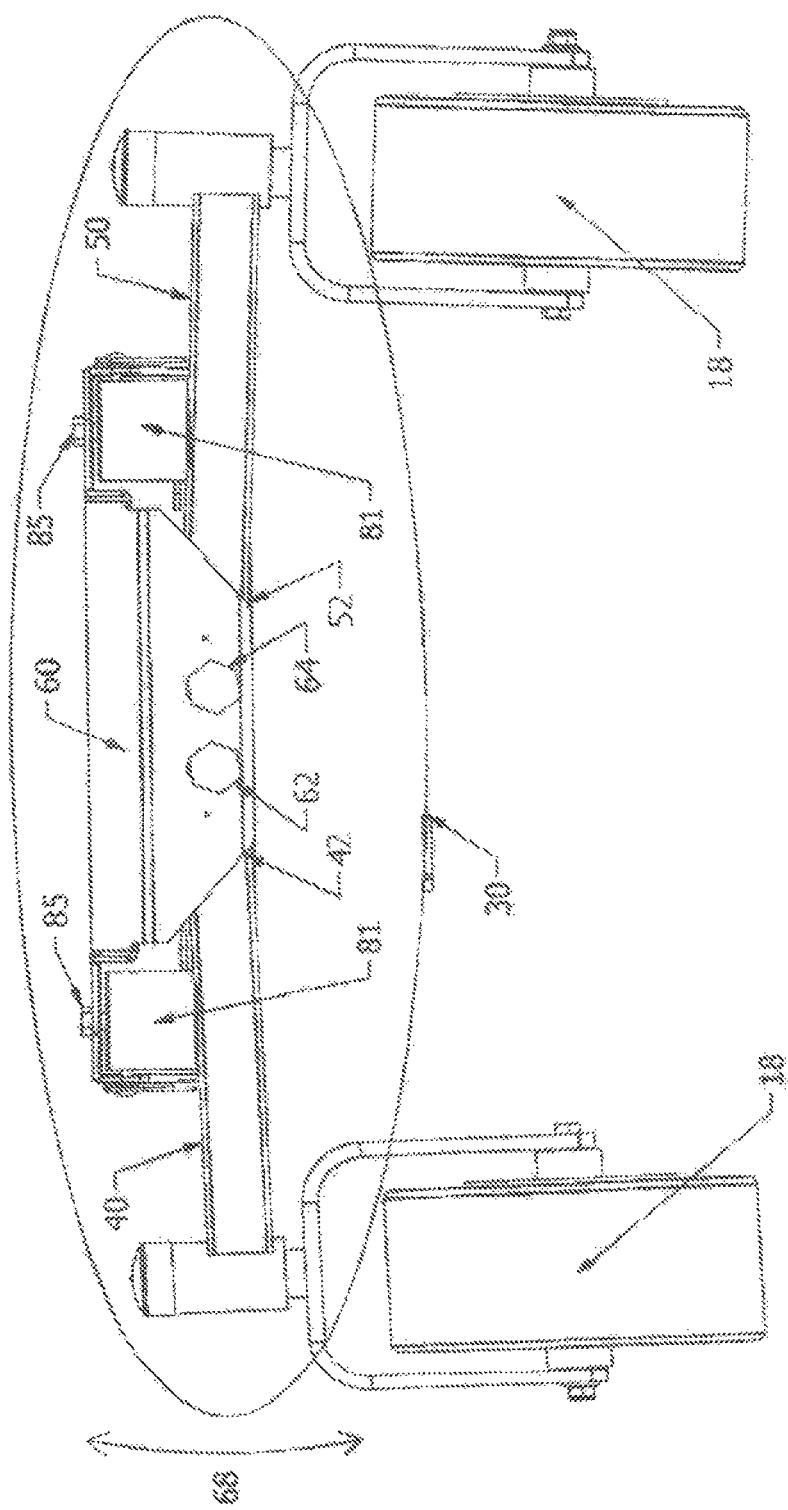
FIG. 2 is a slightly enlarged perspective view of the front of the mower with the front articulating axle shown and with the mower deck removed for clarity.
Figure 3:
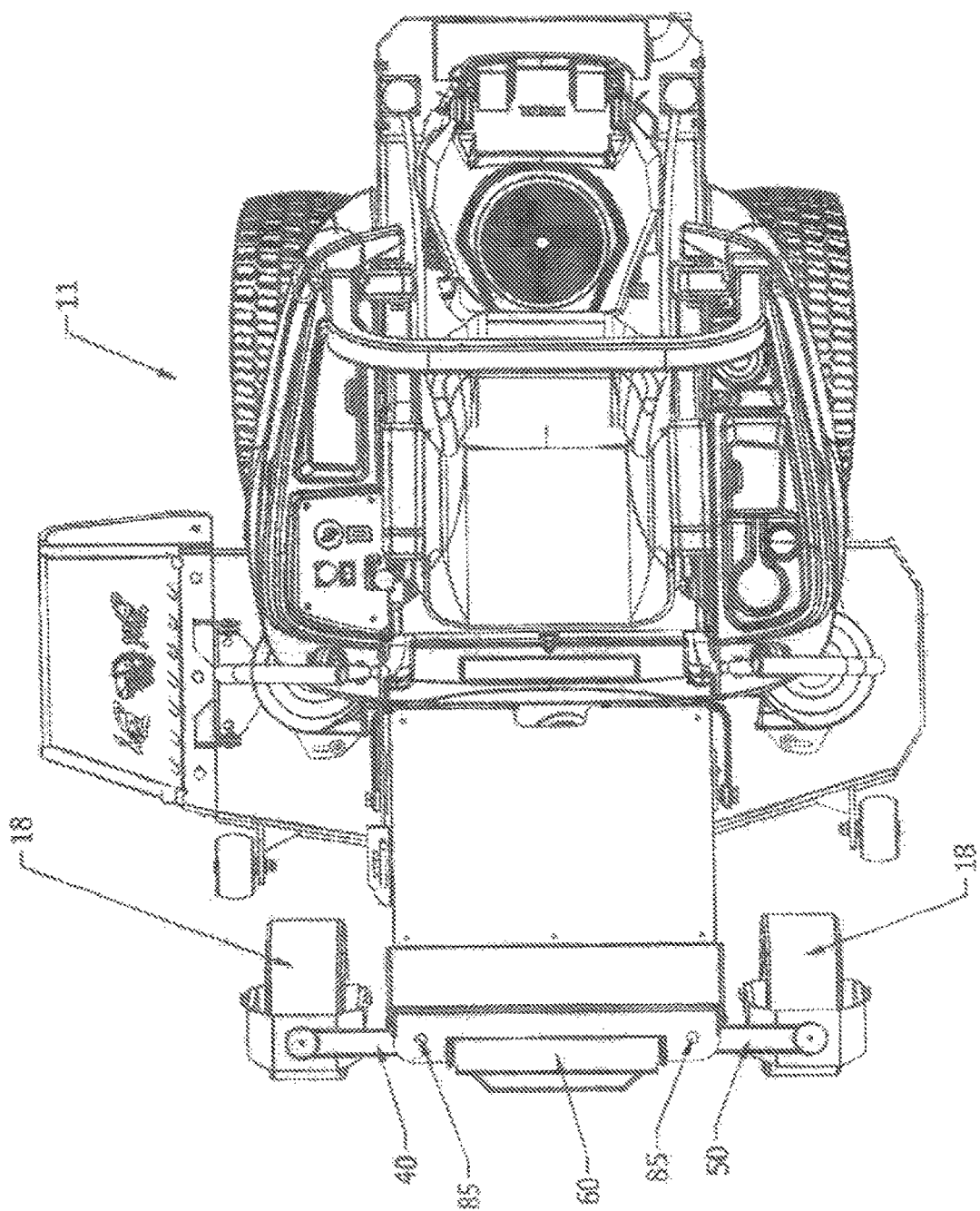
FIG. 3 is a top plan view thereof.
Figure 4:
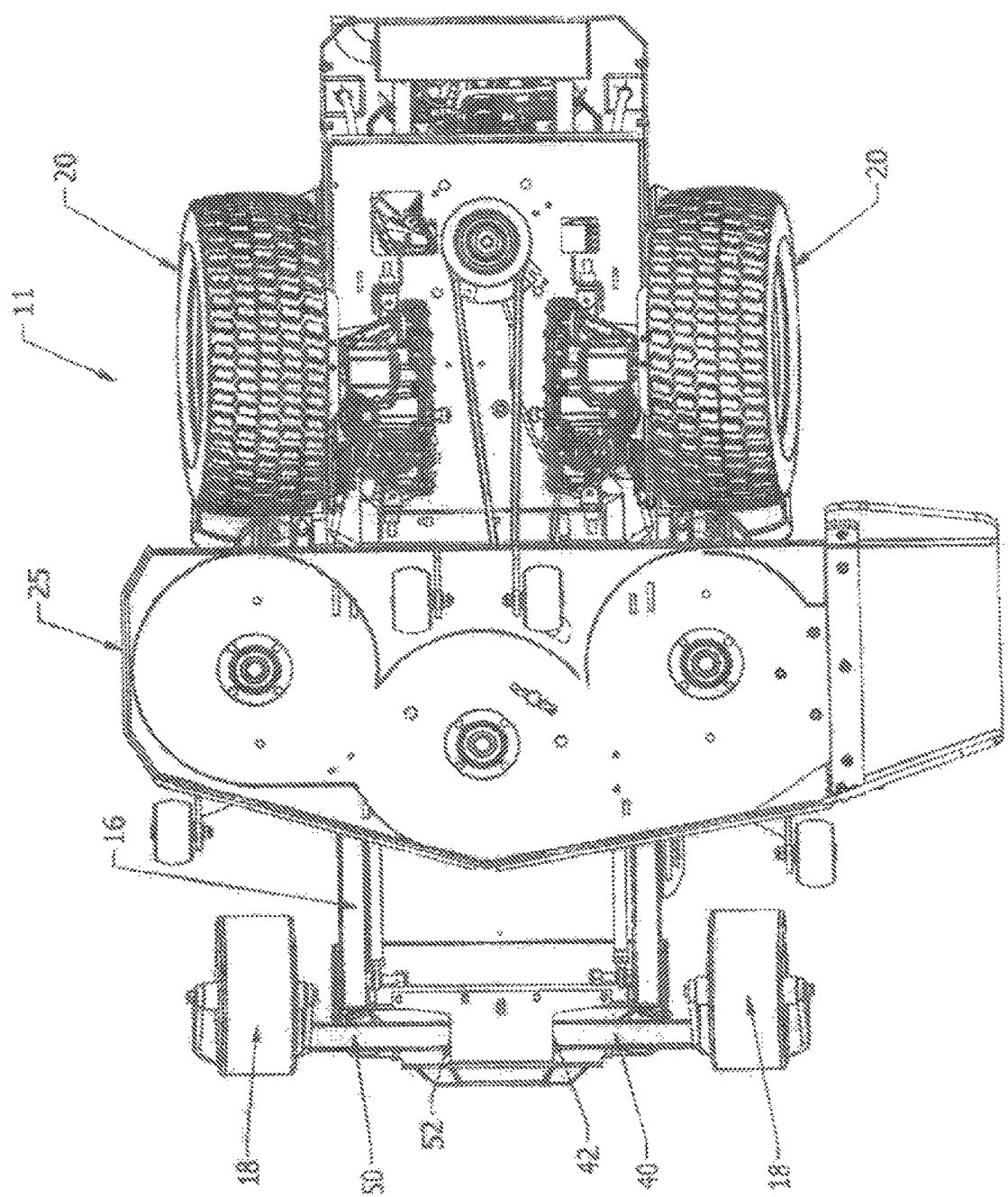
FIG. 4 is a bottom plan view thereof.
Figure 5:
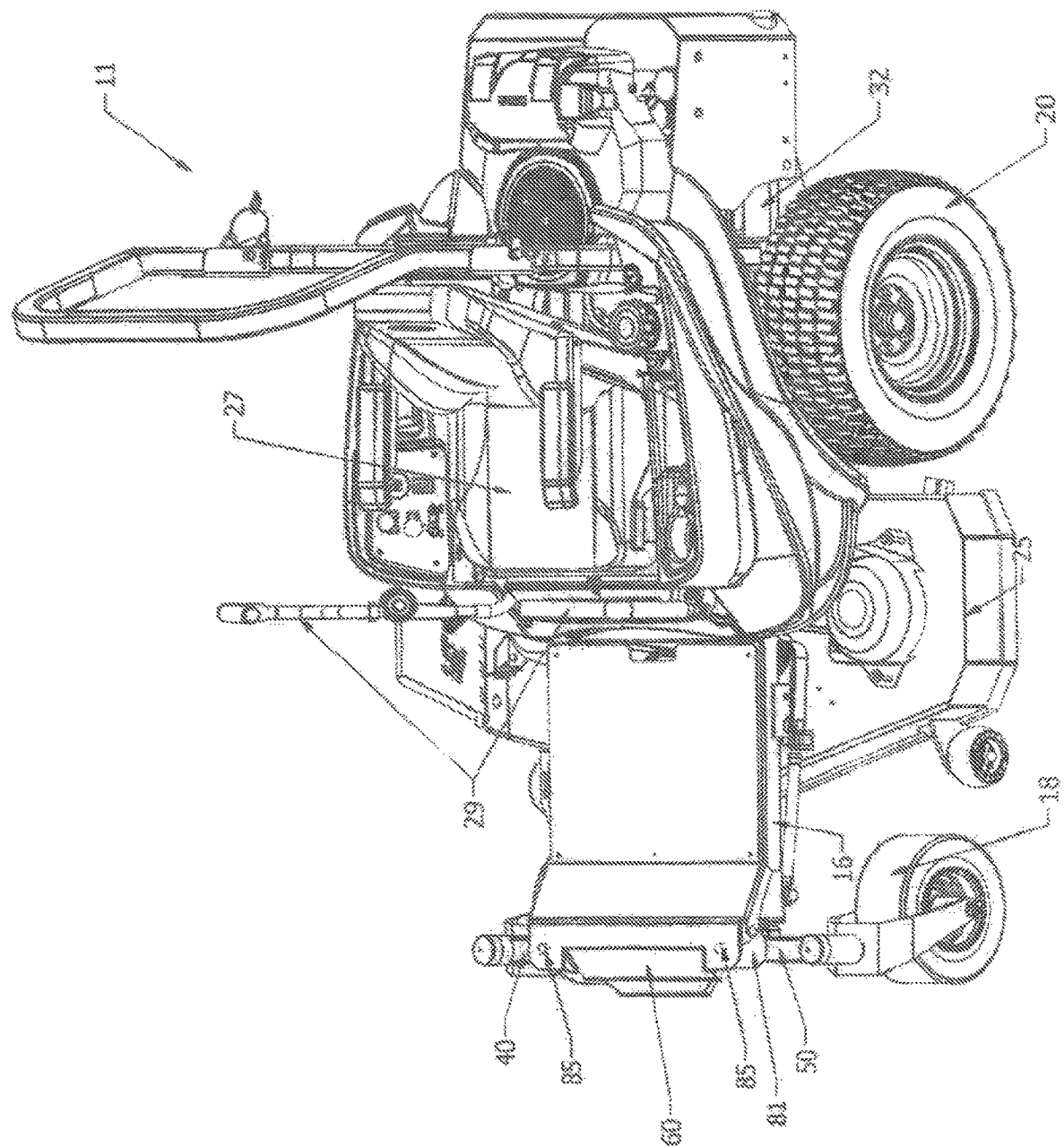
FIG. 5 is an elevational view taken from the side with the opposite side being a mirror image thereof.
Figure 6:
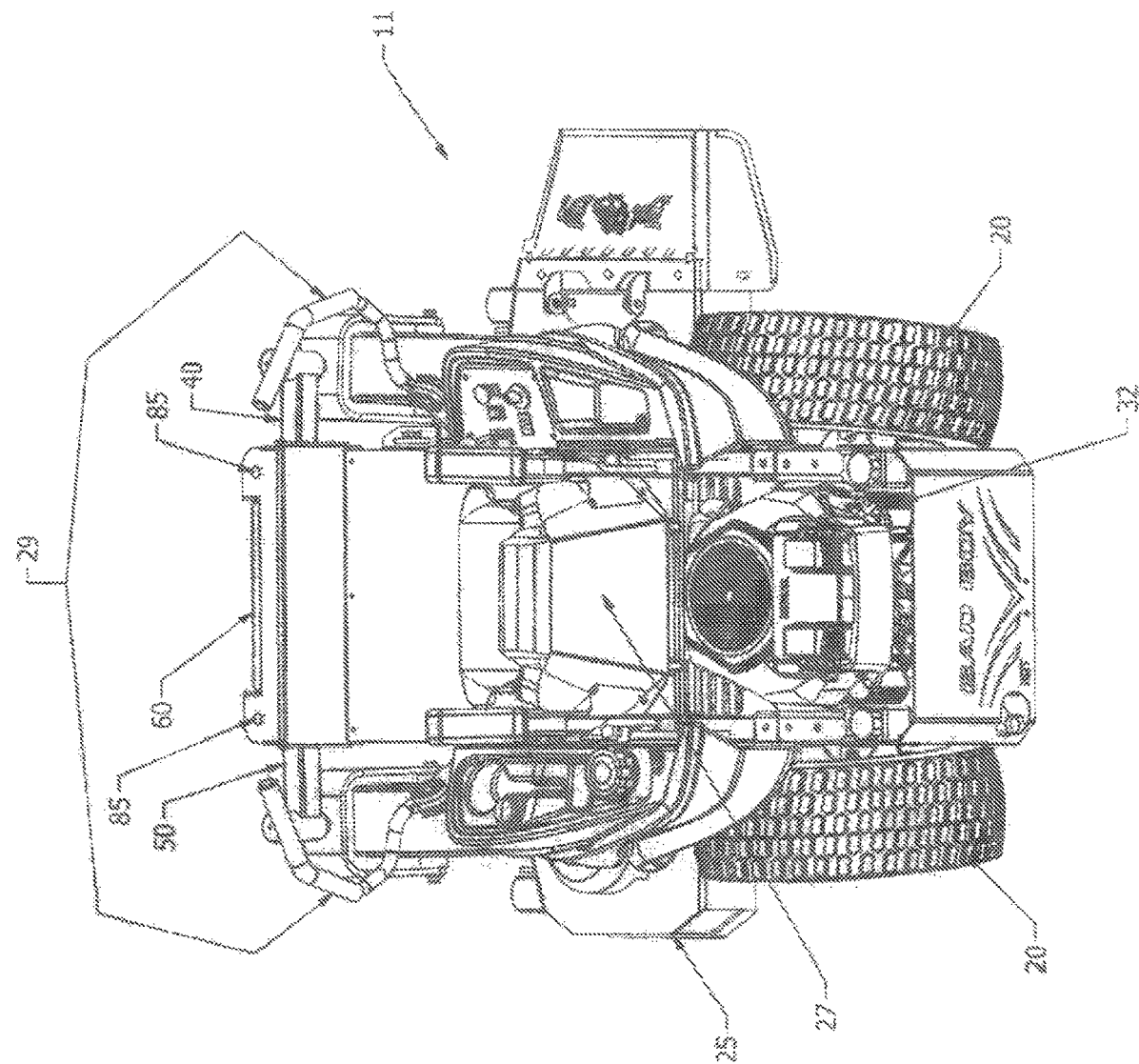
FIG. 6 is an elevational view taken generally from the rear thereof.

The present invention addresses the perceived needs in the known art discussed above. In this regard, the present invention substantially fulfills this need. The improved suspension system for lawnmower includes an articulating front axle with a vibration damping system that makes for a less bumpy ride for the operator on the mower.

In one exemplary embodiment in accordance with the present invention and shown in FIGS. 1-7, an improved riding mower 11 is illustrated. The mower 1 has a frame 16 supported by a pair of forward wheel assemblies 18 and rear wheel assemblies 20.

The frame 16 supports a mower deck 25, and a chair 27 is provided for a driver, with a pair of steering arms 29 within easy reach. A motor compartment 32 rides on the frame and provides motive power to the mower through right and left integrated hydrostatic transaxles that drive right and left rear wheels 72 in response to operator manipulation of control handles 29.

One important feature of the present invention is the provision of the mower 11 which has enhanced comfort and less fatigue for the driver, all of which increases the ability of the driver to control the mower, even in unusual attitudes resulting from irregularities in the terrain, and over extended periods of operation, and particularly where terrain changes are abrupt. In accomplishing its objectives, both forward and rear systems of vibration control are interposed between each of the supporting wheel assemblies and the frame of the mower.

It is a feature of the present invention that a front suspension system is provided with vibration damping capability. Referring to FIGS. 2-7, each articulating suspension arm 40, 50 supports two spaced apart front castered wheels 18; the articulating suspension arms are mounted generally transverse to the longitudinal axis of the mower 11.

The independently, articulating suspension system 30 includes a left and right articulating arm 40, 50 that each has an inner terminus 42, 52 that are proximate each other. The terminuses 42, 52 are captivated by mounting plate 60 with through bolts 62, 64 that are coupled to the front end of frame 16. The bolts 62, 64 permit pivotal movement of articulating arms 40, 50 vertically, both upwardly and downwardly.

The forward end of frame 16 and the leading end of plate 60 effectively sandwich at least a portion of the articulating arms 40, 50 and especially terminuses 42, 52 therebetween to prevent lateral articulating arm movements.

Figure 7:
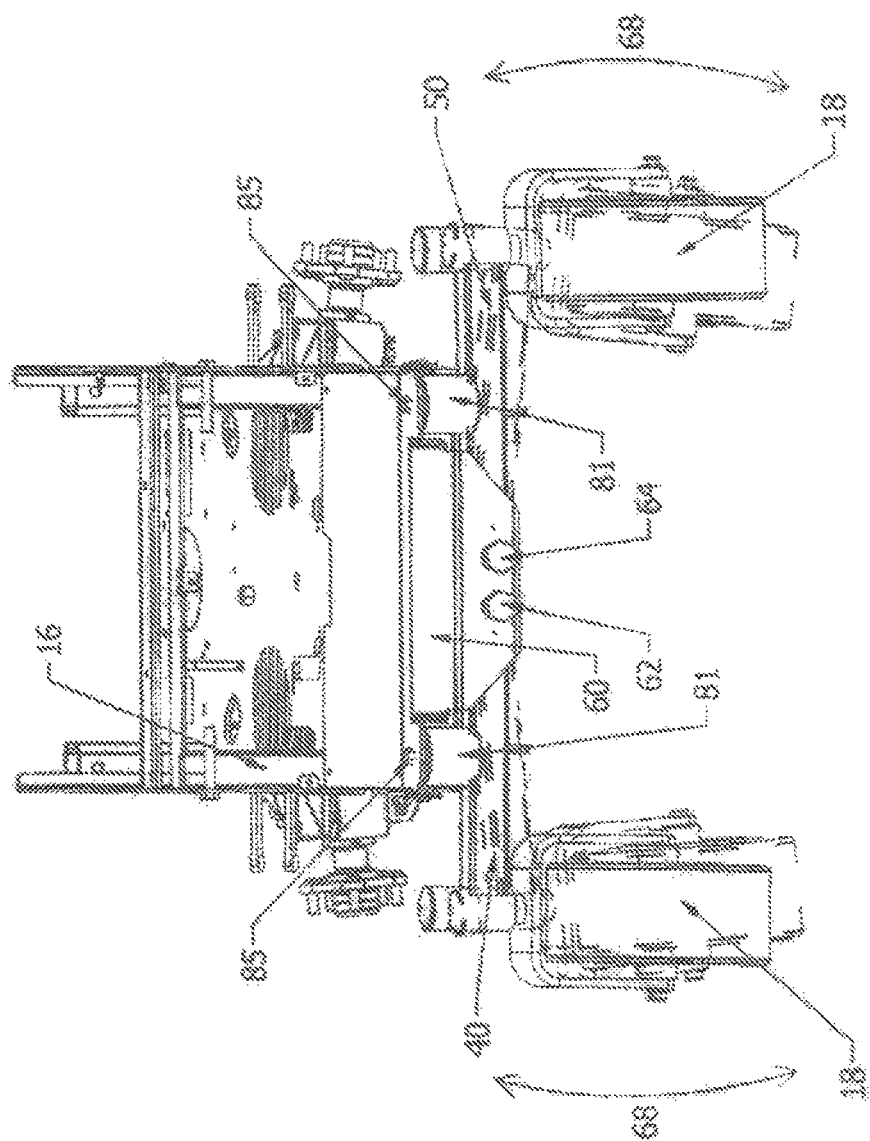
FIG. 7 is an elevational view taken generally from the front and similar to FIG. 2 but showing movement.

Movement of the front wheels is limited and vibration is dampened by the provision of damping pillows 81 which are secured between the mounting plate 60 (which is attached to the front end of frame 16) and the inner terminus of each front articulating arm 40, 50. The pivotal movement of each articulating arm 40, 50 is shown by arrow 68, which corresponds to an accompanying compression of the affected pillows 81 (FIG. 7).

Each pillow 81 is resilient and may be of any one of several durometers of rubber hardness, or may be of other suitable elastomeric materials, including elastic shells with a liquid or other compressible material there within, appropriate to the weight of the mower and the terrain to be traversed. The pillows define a cushion between the wheel and the frame of the mower, thereby absorbing shock created by the wheel moving over the uneven terrain. Further, each wheel functions independently, i.e., independent of the frame, in order that it may respond independently to variations in the terrain met by each individual wheel, which may be several feet removed from its companion wheel.

The pillows 81 are positioned between the articulating arms 40, 50 and the mounting plate 60 and a bolt 85 passes through the mounting plate 60 and is secured by the pillow's threads that run along its longitudinal axis. The pillow is sized to abut the articulating arms 40, 50 and the mounting plate 60 above and beneath each, where it is held in place by bolt 85 and the pillow is compressed by an articulating arm 40, 50 due to the rapid upward movement of a wheel assembly, thereby dampening that movement and inhibiting, or at least modulating, transmission of that movement to the frame of the mower. The rapid movement resulting from the traversing of rocks and other debris is particularly well dampened.

The apparatus of the invention is capable of receiving additional, optional features which are not a part of the present invention. For example, a purchaser or user may specify an optional railing or grab bars may be included to facilitate handling of the device during deployment. Other optional features, some of which may be illustrated herein, may or may not be included with apparatus incorporating the basic aspects of present invention.

In describing a preferred embodiment of the invention illustrated in the drawings, specific terminology has been used for the sake of clarity. However, the invention is not intended to be limited to the specific terms selected, and it is to be understood that each specific term includes all technical equivalents which operate in a similar manner to accomplish a similar purpose.

What is claimed is:

1. A zero-turn-radius (ZTR) riding mower system comprising:
   a frame;
   a front wheel assembly;
   a front articulating arm, the front wheel assembly pivotally coupled to the frame by way of the front articulating arm, and the front articulating arm comprising a distal end coupled to the front wheel assembly and a proximal end pivotally coupled to the frame; and
   a resilient member disposed between the frame and a proximate portion of the front articulating arm that is located between a mid-section of the front articulating arm and the proximal end of the front articulating arm.

2. The system of claim 1, wherein the resilient member is formed of an elastomeric material.

3. The system of claim 1, wherein a first portion of the resilient member abuts a surface of the frame and wherein a second portion of the resilient member abuts a surface of the front articulating arm.

4. The system of claim 1, wherein the resilient member is configured to be compressed between the frame and the proximate portion of the front articulating arm.

5. The system of claim 4, wherein the compression of the resilient member between the frame and the proximate portion of the front articulating arm is configured to regulate pivoting of the front articulating arm.

6. The system of claim 1, wherein the resilient member is coupled to the frame.

7. The system of claim 6, wherein the resilient member is coupled to the frame by way of a resilient member fastening member having a longitudinal axis that is coincident with a longitudinal axis of the resilient member.

8. The system of claim 7, wherein the resilient member fastening member comprises a threaded fastener that is fastened to complementary threads of the resilient member.

9. The system of claim 1, wherein the proximal end of the front articulating arm is pivotally coupled to the frame by way of a front articulating arm fastening member that extends through the proximal end of the front articulating arm.

10. The system of claim 9, wherein the front articulating arm fastening member comprises a threaded fastener that extends through the proximal end of the front articulating arm.

11. The system of claim 1, wherein the proximal end of the front articulating arm is disposed between vertically oriented members of the frame, and wherein the proximal end of the front articulating arm is pivotally coupled to the frame by way of a front articulating arm fastening member that extends between the vertically oriented members.

12. The system of claim 11, wherein the front articulating arm fastening member comprises a threaded fastener that extends between the vertically oriented members.

13. The system of claim 11, wherein the frame comprises a mounting plate that comprises the vertically oriented members of the frame, and wherein the resilient member is disposed between an upper face of the articulating arm and the mounting plate.

14. The system of claim 1, further comprising:
   a second front wheel assembly;
   a second front articulating arm, the second front wheel assembly pivotally coupled to the frame by way of the second front articulating arm, and the second front articulating arm comprising a distal end coupled to the second front wheel assembly and a proximal end pivotally coupled to the frame; and
   a second resilient member disposed between the frame and a proximate portion of the second front articulating arm that is located between a mid-section of the second front articulating arm and the proximal end of the second front articulating arm.

15. The system of claim 14,
   wherein the resilient member is formed of an elastomeric material, and
   wherein the second resilient member is formed of an elastomeric material.

16. The system of claim 14,
   wherein the resilient member is configured to be compressed between the frame and the proximate portion of the front articulating arm, and
   wherein the second resilient member is configured to be compressed between the frame and the proximate portion of the second front articulating arm.

17. The system of claim 16,
   wherein the compression of the resilient member between the frame and the proximate portion of the front articulating arm is configured to regulate pivoting of the front articulating arm, and
   wherein the compression of the second resilient member between the frame and the proximate portion of the second front articulating arm is configured to regulate pivoting of the second front articulating arm.

18. The system of claim 14,
   wherein the resilient member is coupled to the frame, and
   wherein the second resilient member is coupled to the frame.

19. The system of claim 18,
   wherein the resilient member is coupled to the frame by way of a resilient member fastening member having a longitudinal axis that is coincident with a longitudinal axis of the resilient member, and
   wherein the second resilient member is coupled to the frame by way of a second resilient member fastening member having a longitudinal axis that is coincident with a longitudinal axis of the second resilient member.

20. The system of claim 14,
wherein the proximal end of the front articulating arm is pivotally coupled to the frame by way of a front articulating arm fastening member that extends through the proximal end of the front articulating arm, and
wherein the proximal end of the second front articulating arm is pivotally coupled to the frame by way of a second front articulating arm fastening member that extends through the proximal end of the second front articulating arm.

21. The system of claim 14,
wherein the proximal end of the front articulating arm is disposed between vertically oriented members of the frame, and wherein the proximal end of the front articulating arm is pivotally coupled to the frame by way of a front articulating arm fastening member that extends between the vertically oriented members, and
wherein the proximal end of the second front articulating arm is disposed between the vertically oriented members, and wherein the proximal end of the second front articulating arm is pivotally coupled to the frame by way of a second front articulating arm fastening member that extends between the vertically oriented members.

22. The system of claim 21,
wherein the frame comprises a mounting plate that comprises the vertically oriented members of the frame,
wherein the resilient member is disposed between an upper face of the articulating arm and the mounting plate, and
wherein the second resilient member is disposed between an upper face of the second front articulating arm and the mounting plate.

23. The system of claim 14,
wherein the resilient member is formed of an elastomeric material,
wherein the second resilient member is formed of an elastomeric material,
wherein the proximal end of the front articulating arm is pivotally coupled to the frame by way of a front articulating arm fastening member that extends through the proximal end of the front articulating arm,
wherein the proximal end of the second front articulating arm is pivotally coupled to the frame by way of a second front articulating arm fastening member that extends through the proximal end of the second front articulating arm,
wherein the resilient member is configured to be compressed between the frame and the proximate portion of the front articulating arm,
wherein the second resilient member is configured to be compressed between the frame and the proximate portion of the second front articulating arm,
wherein the compression of the resilient member between the frame and the proximate portion of the front articulating arm is configured to regulate pivoting of the front articulating arm, and
wherein the compression of the second resilient member between the frame and the proximate portion of the second front articulating arm is configured to regulate pivoting of the second front articulating arm.

24. A zero-turn-radius (ZTR) riding mower system comprising:
a frame;
a front wheel assembly;
a front articulating arm configured to pivotally couple the front wheel assembly to the frame, the front articulating arm comprising a distal end configured to couple to the front wheel assembly and a proximal end configured to pivotally couple to the frame; and
a resilient member configured to be disposed between the frame and a proximate portion of the front articulating arm that is located between a mid-section of the front articulating arm and the proximal end of the front articulating arm.

25. The system of claim 24, wherein the resilient member is formed of an elastomeric material.

26. The system of claim 24, wherein a first portion of the resilient member is configured to abut a surface of the frame and wherein a second portion of the resilient member is configured to abut a surface of the front articulating arm.

27. The system of claim 24, wherein the resilient member is configured to be compressed between the frame and the proximate portion of the front articulating arm.

28. The system of claim 27, wherein the compression of the resilient member between the frame and the proximate portion of the front articulating arm is configured to regulate pivoting of the front articulating arm.

29. The system of claim 24, wherein the resilient member is configured to be coupled to the frame.

30. The system of claim 29, wherein the resilient member is configured to be coupled to the frame by way of a resilient member fastening member having a longitudinal axis that is coincident with a longitudinal axis of the resilient member.

31. The system of claim 30, wherein the resilient member fastening member comprises a threaded fastener that is configured to fasten to complementary threads of the resilient member.

32. The system of claim 24, wherein the proximal end of the front articulating arm is configured to be pivotally coupled to the frame by way of a front articulating arm fastening member that extends through the proximal end of the front articulating arm.

33. The system of claim 32, wherein the front articulating arm fastening member comprises a threaded fastener that is configured to extend through the proximal end of the front articulating arm.

34. The system of claim 24, wherein the proximal end of the front articulating arm is configured to be disposed between vertically oriented members of the frame, and wherein the proximal end of the front articulating arm is configured to be pivotally coupled to the frame by way of a front articulating arm fastening member that extends between the vertically oriented members.

35. The system of claim 34, wherein the front articulating arm fastening member comprises a threaded fastener that is configured to extend between the vertically oriented members.

36. The system of claim 34, wherein the frame comprises a mounting plate that comprises the vertically oriented members of the frame, and wherein the resilient member is configured to be disposed between an upper face of the articulating arm and the mounting plate.

37. The system of claim 24, further comprising:
a second front wheel assembly;
a second front articulating arm, the second front wheel assembly configured to pivotally couple to the frame by way of the second front articulating arm, and the second front articulating arm comprising a distal end configured to couple to the second front wheel assembly and a proximal end configured to pivotally couple to the frame; and
a second resilient member configured to be disposed between the frame and a proximate portion of the second front articulating arm that is located between a mid-section of the second front articulating arm and the proximal end of the second front articulating arm.

38. The system of claim 37, wherein the resilient member is formed of an elastomeric material, wherein the second resilient member is formed of an elastomeric material, wherein the proximal end of the front articulating arm is configured to be pivotally coupled to the frame by way of a front articulating arm fastening member that extends through the proximal end of the front articulating arm, wherein the proximal end of the second front articulating arm is configured to be pivotally coupled to the frame by way of a second front articulating arm fastening member that extends through the proximal end of the second front articulating arm, wherein the resilient member is configured to be compressed between the frame and the proximate portion of the front articulating arm, wherein the second resilient member is configured to be compressed between the frame and the proximate portion of the second front articulating arm, wherein the compression of the resilient member between the frame and the proximate portion of the front articulating arm is configured to regulate pivoting of the front articulating arm, and wherein the compression of the second resilient member between the frame and the proximate portion of the second front articulating arm is configured to regulate pivoting of the second front articulating arm.

\* \* \* \* \*